United States Patent [19]

Haleen et al.

[11] 4,014,985

[45] Mar. 29, 1977

[54] PRECIPITATION OF ALUMINUM OXIDE HAVING LOW SODIUM OXIDE CONTENT

[75] Inventors: Leonard W. Haleen, Edwardsville, Ill.; Alan Pearson, St. Louis, Mo.

[73] Assignee: Aluminum Company of America, Pittsburgh, Pa.

[22] Filed: Dec. 22, 1975

[21] Appl. No.: 643,380

[52] U.S. Cl. .............................. 423/629; 423/121; 423/127

[51] Int. Cl.² .......................................... C01F 7/14

[58] Field of Search ........... 423/121, 122, 127, 629

[56] References Cited

UNITED STATES PATENTS

| | | | |
|---|---|---|---|
| 2,574,008 | 11/1951 | Beja | 423/127 |
| 2,653,858 | 9/1953 | Brown | 423/629 |
| 2,657,978 | 11/1953 | Johnson | 423/122 |
| 2,707,669 | 5/1955 | Houston et al. | 423/127 |
| 3,201,199 | 8/1965 | Lindsay et al. | 423/127 |
| 3,265,466 | 8/1966 | Mollard | 423/127 |
| 3,486,850 | 12/1969 | Day | 423/127 |
| 3,545,923 | 12/1970 | Mercier et al. | 423/127 |
| 3,649,184 | 3/1972 | Featherson | 423/629 |

*Primary Examiner*—Herbert T. Carter
*Attorney, Agent, or Firm*—John P. Taylor

[57] ABSTRACT

Aluminum oxide having a sodium oxide content after calcination of less than 0.1% by weight is continuously precipitated as aluminum hydroxide from a Bayer process liquor by a controlled slow precipitation. The controlled, slow precipitation rate required to create a low soda product is achieved by controlling the residence time of liquor in the precipitation vessel so as to provide a constant, low ratio of aluminum oxide to sodium oxide. Residence time control in a Bayer process plant is achieved by controlling green liquor flow rate to the tank, or by sizing the tank for a constant flow. The use of heavy seed charges to increase the seed surface area permits the production of a low soda product at a faster precipitation rate.

2 Claims, 2 Drawing Figures

PRECIPITATION OF ALUMINUM OXIDE HAVING LOW SODIUM OXIDE CONTENT

BACKGROUND OF THE INVENTION

This invention relates to the production of aluminum oxide. More particularly, this invention relates to the production, from a Bayer process, of aluminum oxide having low sodium oxide content.

Normally, in the production of aluminum oxide from a Bayer process, economic considerations dictate precipitation of the aluminum oxide (in the hydroxide form) from the mother liquor at the fastest possible rate in order to minimize tank volume required to produce a given yield. At any given temperature the degree of supersaturation drives the precipitation rate with the fastest rate being accomplished at higher ratios of aluminum oxide to sodium oxide. Unfortunately, precipitation of aluminum hydroxide from the liquor at a high aluminum oxide to sodium oxide ratio results in a precipitate which is high in sodium oxide content. By "high" is meant greater than 0.2% by weight $Na_2O$ in the $Al_2O_3$.

While it is known to precipitate aluminum hydroxide at a slow rate to achieve a precipitate having a low sodium oxide content, this is normally accomplished using temperature control by raising the precipitation tank to an elevated temperature thus lowering the degree of saturation resulting in a lower precipitation rate. A considerable amount of energy, however, must be expended in providing such an elevated temperature to a large tank. It thus would be desirable to achieve such controlled precipitation at a low aluminum oxide to sodium oxide ratio without the need for such elevated temperatures.

SUMMARY OF THE INVENTION

Quite suprisingly, it has now been discovered that the production of aluminum oxide having low sodium oxide content can be achieved using a volumetric control rather than temperature control.

In accordance with the invention, aluminum oxide having a sodium oxide content after calcining of less than 0.1% by weight comprises precipitating aluminum hydroxide from a sodium aluminate liquor having an aluminum oxide to sodium oxide (expressed as $Na_2O$) ratio of less than 1.04 and at a rate in grams aluminum oxide per liter per hour which when divided by the area of aluminum hydroxide seed in meter$^2$ per liter equals not more than 0.03 grams aluminum oxide per meter$^2$ aluminum hydroxide seed per hour. The ratio of aluminum oxide to sodium oxide is kept at less than 1.04 by maintaining a longer residence time. This is accomplished by either using larger tank volume or reducing the liquor flow.

DESCRIPTION OF THE INVENTION

Figure 1:
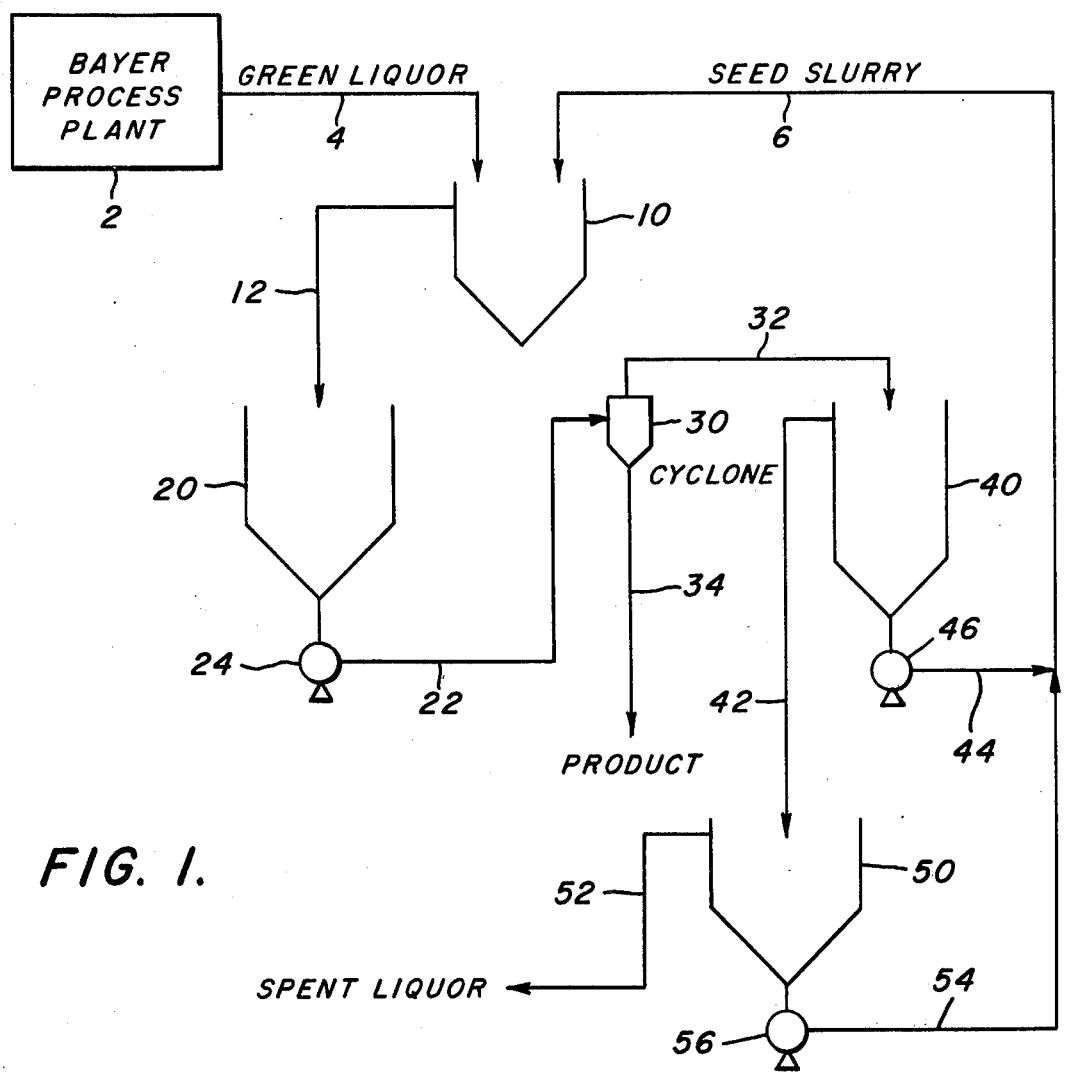
FIG. 1 is a diagrammatic flowsheet illustrating an embodiment of the invention.

Turning now to FIG. 1, a diagrammatic flowsheet is shown wherein green liquor from a Bayer process plant 2 passes via a line 4 to a first precipitation tank 10. The ratio of aluminum oxide to sodium oxide ($Al_2O_3:Na_2O$) in the green liquor is 1.04. At the same time, an aluminum hydroxide seed slurry is fed into precipitation tank 10 via line 6. Seed slurry line 6 feeds in seed having a particle size of about 55 microns and a solids content of about 510 grams per liter. This size seed, together with this solids to liquid ratio provides a seed area of about 24 meter$^2$ per liter of liquor-seed slurry in precipitation tank 10. The rates of flow of the green liquor via line 4 and the seed slurry via line 6 are adjusted with respect to the volume of tank 10 to provide an overall ratio of aluminum oxide to sodium oxide in precipitation tank 10 of about 0.68. The temperature of precipitation tank 10 is kept about 55°–80° C, preferably about 74° C.

To obtain the reduction in ratio from the 1.04 ratio of the incoming green liquor down to the operating ratio in precipitation tank 10 of about 0.68, it is necessary to adjust the flow in liters per minute to about 0.043% of the total volume of tank 10. This ratio of input to total tank volume provides a longer residence time within the tank than would be possible with a tank with smaller volume or a higher incoming flow rate. This longer residence time in turn keeps the ratio lower and thus permits a precipitation of aluminum hydroxide having a much lower sodium oxide content.

In accordance with the invention, the effect of the seed size used in precipitation tank 10 partially offsets the reduction in the precipitation rate which otherwise would be experienced at the lower ratio and longer residence time.

Figure 2:
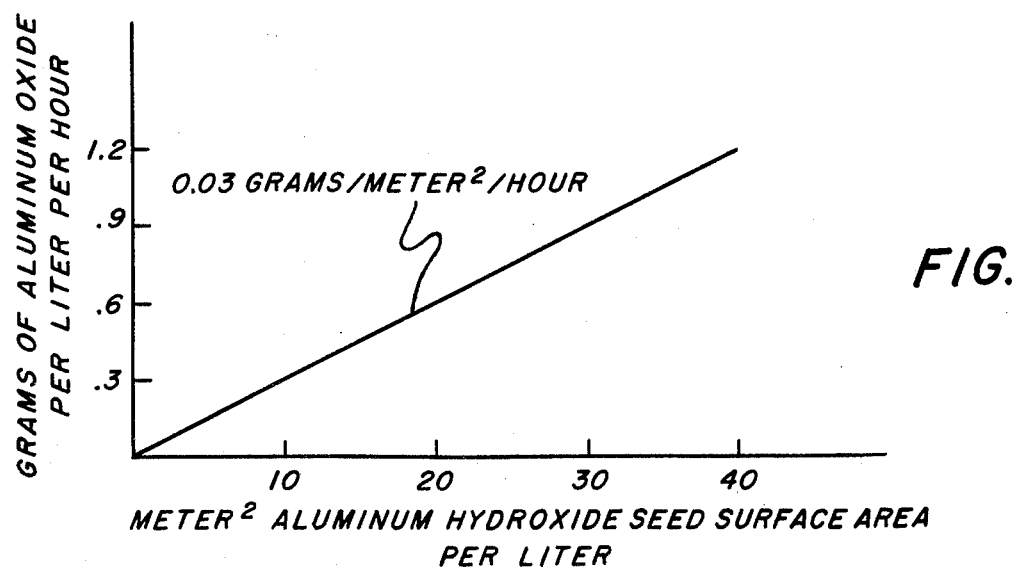
FIG. 2 is a graph showing the relationship of the precipitation rate to the area of seed to achieve the aluminum oxide precipitate having low sodium oxide content.

Referring now to FIG. 2, the relationship of the precipitation rate to the area of the seed is depicted. It can be seen therefrom that as the area of the seed in meter$^2$ per liter is increased, the total precipitation rate in grams per liter per hour may be increased without exceeding the total desired rate in grams of precipitate per meter$^2$ of seed per hour which, it has been found, will result in an aluminum hydroxide precipitate having low sodium oxide content, i.e. less than 0.1% sodium oxide in the aluminum oxide upon subsequent calcination.

It should be noted at this point that the product which precipitates, and the seed used to obtain such precipitation are referred to herein as aluminum hydroxide while the amount of sodium oxide is usually referred to with respect to the aluminum oxide content. This is because the desired final calcined product is aluminum oxide. Furthermore, it is customary, for analytical purposes to refer to, and analyze for, the dissolved material (prior to precipitation) as aluminum oxide.

The resultant precipitate liquor slurry leaves tank 10 via line 12 and enters a second precipitation tank 20. This tank is operated at a slightly lower operation ratio of about 0.61 with a slightly reduced temperature of about 70° C. The flow via line 12 is (in liters per minute) approximately 0.115% of the total volume of tank 20 to provide the desired long residence time and low operating ratio of aluminum oxide to sodium oxide in tank 20.

Similarly, the precipitated aluminum oxide and green liquor leave tank 20 as a slurry which is pumped at 24 via line 22 to wet cyclone 30. Solids leave cyclone 30 at line 34 while the liquor and fines leave cyclone 30 via line 32. The solids from line 34 are filtered and the aluminum hydroxide product of low sodium oxide content recovered therefrom. The fines and liquor proceed as a slurry via line 32 to a classification tank 40 where they are separated, the solids leaving as a dense slurry at line 44 while the fines and liquor leave as a dilute slurry via line 42 for processing through a third separation tank 50. The spent liquor leaves tank 50 at line 52 while the solids leave tank 50 at line 54. The solids in line 54 are then pumped back together with the dense slurry from tank 40 respectively by pumps 46 and 56 to precipitation tank 10 as seed slurry via line 6.

To further illustrate the invention, a green liquor slurry having a ratio of about 1.04 aluminum oxide to sodium oxide was pumped to a 795,000 liter precipitation tank at a rate of about 341 liters per minute. The tank was maintained at a temperature of about 74° C. At the same time, a seed slurry providing 510 grams per liter of seed having an average particle size of 55 microns was pumped into the precipitation tank at a rate of about 568 liters per minute to provide a seed area in the precipitation tank of about 24 meter$^2$ per liter. The precipitation rate in the first tank was approximately 490 Kg $Al_2O_3$ per hour (.62 grams per liter per hour). Precipitated aluminum oxide and liquor were removed from the tank as a slurry at a rate of about approximately 908 liters per minute into a second tank having a volume of 795,000 liters. The ratio of aluminum oxide to sodium oxide in this tank was about 0.61. The second tank was maintained at a temperature of about 74° C. The precipitation rate in the second tank was 262 Kg $Al_2O_3$ per hour (0.33 grams per liter per hour). In both tanks, therefore, the precipitation rate in grams aluminum oxide per liter per hour when divided by the area of aluminum hydroxide seed in meter$^2$ per liter was less than the 0.03 grams maximum aluminum oxide per meter$^2$ aluminum hydroxide seed per hour required in accordance with the invention to produce the low soda alumina.

The underflow of the second tank was pumped through a cyclone to separate the product fraction. The seed in the overflow from the cyclone was sent to a seed storage tank and recycled to the first tank. The very fine seed which overflowed the seed storage tank was collected in a tray thickener and periodically returned to the first tank. The aluminum oxide precipitate was subsequently calcined and then analyzed for sodium oxide content. The sodium oxide content was found to be less than 0.1% by weight.

What is claimed is:

1. The process of producing an aluminum oxide having a sodium oxide content after calcining of less than 0.1% by weight which comprises:
    a. continuously precipitating aluminum oxide in a first tank maintained at a temperature of 55°–80° C and an alumina-to-caustic ratio of 0.68 while
        1. adding feed liquor at an alumina-to-caustic ratio of 1.04 into said tank at a flow rate in liters per minute equal to approximately 0.043% of the volume of said tank; and
        2. simultaneously adding aluminum hydroxide seed slurry to said tank at a rate in meters$^2$ per hour to maintain a precipitation rate in said tank of less than 0.03 grams $Al_2O_3$ per hour per meter$^2$ of said aluminum hydroxide seed added to the tank per hour;
    b. feeding the resultant precipitate slurry from said first tank to a second tank maintained at a temperature of about 70° C at a flow rate in liters per minute equal to 0.115% of the volume of said second tank to maintain an alumina-to-caustic ratio of about 0.61 in said second tank; and
    c. recovering a low soda aluminum hydroxide precipitate from said second tank characterized by a sodium oxide content after calcining of less than 0.1% by weight.

2. The process of claim 1 wherein said temperature in said first tank is maintained at about 74° C.

* * * * *